US010728161B2

(12) United States Patent
Hwang et al.

(10) Patent No.: US 10,728,161 B2
(45) Date of Patent: Jul. 28, 2020

(54) METHOD AND APPARATUS FOR TRANSMITTING AND RECEIVING PACKET IN COMMUNICATION SYSTEM

(71) Applicant: Samsung Electronics Co., Ltd., Suwon-si, Gyeonggi-do (KR)

(72) Inventors: Sung-Hee Hwang, Suwon-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/129,294

(22) PCT Filed: Mar. 30, 2015

(86) PCT No.: PCT/KR2015/003104
§ 371 (c)(1),
(2) Date: Sep. 26, 2016

(87) PCT Pub. No.: WO2015/147610
PCT Pub. Date: Oct. 1, 2015

(65) Prior Publication Data
US 2017/0104685 A1    Apr. 13, 2017

(30) Foreign Application Priority Data

Mar. 28, 2014    (KR) .................. 10-2014-0037265

(51) Int. Cl.
*H04L 1/00* (2006.01)
*H04N 21/2662* (2011.01)
(Continued)

(52) U.S. Cl.
CPC ............ *H04L 47/32* (2013.01); *H04L 1/0006* (2013.01); *H04L 1/0041* (2013.01);
(Continued)

(58) Field of Classification Search
CPC ..... H04L 1/004; H04L 1/0041; H04L 1/0083; H04L 12/18; H04L 1/0006; H04L 1/0072;
(Continued)

(56) References Cited

U.S. PATENT DOCUMENTS 8,867,340 B2 * 10/2014 Zriny ................... H04L 1/005
370/229
2004/0073929 A1 *  4/2004 Morello ............... H04L 1/0003
725/63
(Continued)

FOREIGN PATENT DOCUMENTS

CN        102137438 A        7/2011
CN        102334295 A        1/2012
(Continued)

OTHER PUBLICATIONS

DVB-T2 baseline document, TM 3953, DVB-TM-T2 Baseline Description, Version 0.1.6, Jan. 21, 2008.
(Continued)

*Primary Examiner* — Habte Mered
*Assistant Examiner* — Prince A Mensah
(74) *Attorney, Agent, or Firm* — Jefferson IP Law, LLP

(57) ABSTRACT

The present invention relates to a method for transmitting a packet in a communication system, the method comprising: generating drop information indicating at least one source packet to be dropped among source packets to be transmitted and whether or not to drop each of the other source packets except the at least one source packet; performing forward error correction (FEC) encoding on the drop information and the other source packets except the at least one source packet; generating a repair packet comprising repair data for restoring the drop information and a repair symbol for restoring the other source packets except the at least one
(Continued)

source packet; and transmitting the other source packets except the at least one source packet and the repair packet.

12 Claims, 10 Drawing Sheets

(51) Int. Cl.
  *H04L 12/823* (2013.01)
  *H04N 21/2343* (2011.01)
  *H04N 21/2383* (2011.01)
  *H04L 29/08* (2006.01)

(52) U.S. Cl.
  CPC .......... *H04L 1/0057* (2013.01); *H04L 1/0072* (2013.01); *H04L 69/329* (2013.01); *H04N 21/2343* (2013.01); *H04N 21/2383* (2013.01); *H04N 21/2662* (2013.01)

(58) Field of Classification Search
  CPC ... H04L 47/32; H04L 69/329; H01L 12/1868; H04N 21/00; H04N 21/20; H04N 21/2343–23476; H04N 21/2383
  See application file for complete search history.

(56) References Cited

U.S. PATENT DOCUMENTS

| | | | | |
|---|---|---|---|---|
| 2007/0300127 | A1* | 12/2007 | Watson | H03M 13/03 714/758 |
| 2008/0002580 | A1 | 1/2008 | Kawada et al. | |
| 2008/0008155 | A1 | 1/2008 | Yoon et al. | |
| 2008/0134266 | A1 | 6/2008 | Kang | |
| 2009/0067551 | A1* | 3/2009 | Chen | H04L 1/004 375/340 |
| 2009/0213726 | A1* | 8/2009 | Asati | H04L 1/007 370/216 |
| 2010/0017686 | A1* | 1/2010 | Luby | H04N 21/2381 714/776 |
| 2010/0122144 | A1* | 5/2010 | Lee | H03M 13/258 714/755 |
| 2010/0223533 | A1* | 9/2010 | Stockhammer | H03M 13/373 714/776 |
| 2012/0317461 | A1* | 12/2012 | Hwang | H03M 13/2906 714/776 |
| 2013/0290814 | A1* | 10/2013 | Hwang | H04L 1/004 714/776 |
| 2014/0307734 | A1* | 10/2014 | Luby | H04L 12/18 370/390 |
| 2015/0055549 | A1 | 2/2015 | Yamamoto et al. | |

FOREIGN PATENT DOCUMENTS

| | | |
|---|---|---|
| EP | 1 408 637 A1 | 4/2004 |
| EP | 2 088 708 A1 | 8/2009 |
| JP | 7-250321 A | 9/1995 |
| JP | 2008-011096 A | 1/2008 |
| JP | 2009-504075 A | 1/2009 |
| JP | 2013-207735 A | 10/2013 |
| JP | 2014-150451 A | 8/2014 |
| KR | 10-2008-0047263 A | 5/2008 |
| KR | 10-2008-0052346 A | 6/2008 |
| KR | 10-2010-0117000 A | 11/2010 |
| KR | 10-2016-0130593 A | 11/2016 |

OTHER PUBLICATIONS

European Search Report dated Jan. 16, 2018 issued in European Application No. 15768498.6-1220.
Cornelius Hellge et al., On FEC signaling for MMT, 106.MPEG Meeting Oct. 28, 2013-Jan. 11, 2013; Geneva; Motion Picture Expert Group or ISO/IEC JTC1 /SC29/WG11, Oct. 31, 2013.
Japanese Office Action dated Oct. 2, 2018, issued in Japanese Patent Application No. 2016-558749.
Chinese Office Action dated Jun. 5, 2019, issued in Chinese Application No. 201580017090.8.
Chinese Examination report dated Mar. 30, 2020, issued in Chinese Application No. 201580017090.8.

* cited by examiner

METHOD AND APPARATUS FOR TRANSMITTING AND RECEIVING PACKET IN COMMUNICATION SYSTEM

PRIORITY

This application is a National Phase Entry of PCT International Application No. PCT/KR2015/003104, which was filed on Mar. 30, 2015, and claims a priority to Korean Patent Application No. 10-2014-0037265, which was filed on Mar. 28, 2014, the contents of which are incorporated herein by reference.

TECHNICAL FIELD

The present invention relates to a method and an apparatus for transmitting and receiving a packet in a communication system.

BACKGROUND ART

In a communication system, data congestion has become more serious due to variety of contents and an increase in high capacity contents such as High Definition (HD) contents and Ultra High Definition (UHD) contents. Further, due to the data congestion, contents which a sender, for example, host A transmits is not normally transferred to a receiver, for example, host B, and some of the contents are lost on route.

In general, since data is transmitted in the unit of packets, the loss of contents is generated in the unit of packets. The packet includes a block of data to be transmitted, address information, and management information. The data block may be, for example, a payload, the address information may be a source address or a destination address, and the management information may be, for example, a header.

Accordingly, when the packet loss is generated in the network, the receiver cannot receive the lost packet, and thus cannot know a data block and management information within the lost packet. Therefore, it causes deterioration of audio quality, degradation of video image quality or an image breaking, an omission of a subtitle, a loss of a file and the like making an inconvenience for a user.

In order to prevent the packet loss, a method of artificially dropping and transmitting data that does not have a large influence on reproduction of contents from the packet to be transmitted is used as a method of reducing loads of the network. The data that does not have a large influence on the reproduction of the contents may be, for example, a B-frame. However, such a method also cannot remove the packet loss in the network, so that Application Layer-Forward Error Correction (AL-FEC) is required as a method of restoring the packet loss generated in the network even in transmission through the packet drop. Further, a method of configuring an FEC packet and transmitting/receiving the FEC packet is required.

SUMMARY

Technical Problem

The present invention provides a method and an apparatus for transmitting/receiving a packet in a communication system.

Further, the present invention provides a method and an apparatus for transmitting/receiving an FEC packet in a communication system.

Technical Solution

A method of transmitting a packet in a communication system according to an embodiment of the present invention includes: generating drop information indicating the existence or non-existence of a drop of each of at least one source packet to be dropped and remaining source packets except for the at least one source packet among source packets to be transmitted; generating a repair packet including repair data for reconstructing the drop information and a repair symbol for reconstructing the remaining source packets except for the at least one source packet by performing Forward Error Correction (FEC) encoding on the drop information and the remaining source packets except for the at least one source packet; and transmitting the remaining source packets except for the at least one source packet and the repair packet.

A method of receiving a packet in a communication system according to another embodiment of the present invention includes: receiving source packets and a repair packet generated by performing Forward Error Correction (FEC) encoding on the source packets; acquiring repair data for reconstructing drop information indicating the existence or non-existence of a drop of each of the source packets and a repair symbol for reconstructing the source packets from the repair packet; reconstructing the drop information based on the repair data and recognizing a source packet which a transmission device dropped from the reconstructed drop information; and reconstructing a source packet lost during transmission based on the repair symbol.

An apparatus for transmitting a packet in a communication system according to an embodiment of the present invention includes: a drop information generator that generates drop information indicating the existence or non-existence of a drop of each of at least one source packet to be dropped among source packets to be transmitted and source packets before the drop; an encoder that generates a repair packet including repair data for reconstructing the drop information and a repair symbol for reconstructing the remaining source packets except for the at least one source packet by performing Forward Error Correction (FEC) encoding on the drop information and the remaining source packets except for the at least one source packet; and a transmitter that transmits the remaining source packets except for the at least one source packet and the repair packet.

An apparatus for receiving a packet in a communication system according to another embodiment of the present invention includes: a receiver that receives source packets, drop information indicating the existence or non-existence of a drop of each of the source packets, and a repair packet generated by performing Forward Error Correction (FEC) encoding on the source packets; and a decoder that acquires repair data for reconstructing drop information from the repair packet and a repair symbol for reconstructing the source packets from the repair packet, reconstructing the drop information based on the repair data and recognizing a source packet which a transmission device dropped from the reconstructed drop information, and reconstructing a source packet lost during transmission based on the repair symbol.

Effects of the Invention

The present invention has an effect of providing good quality contents and services to a user through an application of FEC even in a packet drop by providing, by a reception device, a method and an apparatus for recognizing an FEC application method in a packet drop situation by a transmission device.

DETAILED DESCRIPTION

Figure 1:
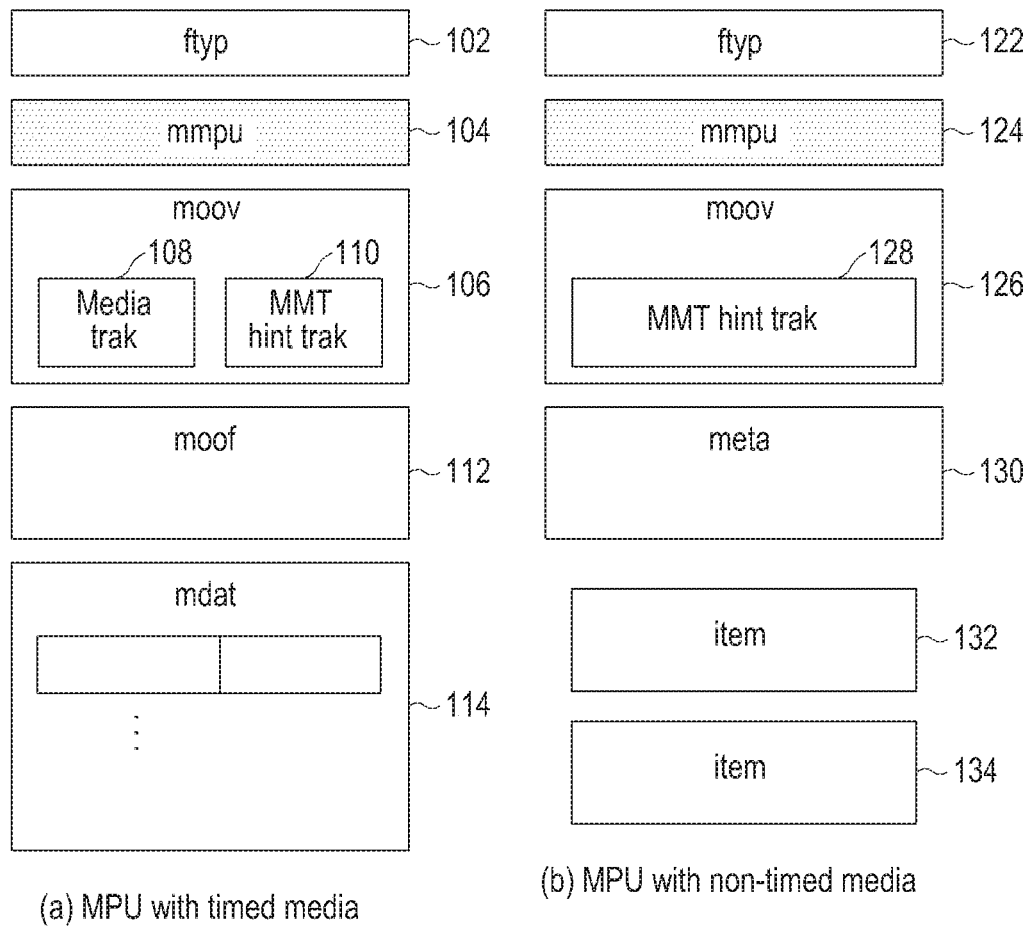
FIG. 1 illustrates an example of an MPU format according to an embodiment of the present invention.

Hereinafter, exemplary embodiments of the present invention will be described in detail with reference to the accompanying drawings. Further, in the following description of the present invention, a detailed description of known functions or configurations incorporated herein will be omitted when it may make the subject matter of the present invention rather unclear. The terms which will be described below are terms defined in consideration of the functions in the present invention, and may be different according to users, intentions of the users, or customs. Therefore, the definitions of the terms should be made based on the contents throughout the specification.

Prior to the description of embodiments of the present invention, the terms used in the specification are defined as follows.

(1) Asset: indicates a multimedia data entity related to a unique identifier and used to generate a multimedia presentation (2) Encoding symbol: indicates a unit of data generated by an encoding process (3) Encoding symbol block: indicates a set of encoding symbols (4) FEC code: indicates an algorithm for data encoding to make an encoded data flow have a recovery from a data loss (5) FEC payload ID (Identifier): indicates an identifier for identifying contents of an MMT packet for an MMT FEC scheme (6) FEC repair: indicates an MMT packet having a repair FEC payload ID for transferring one or more repair symbols of a repair symbol block (7) FEC source packet: indicates an MMT packet having an MMT packet or a source FEC payload ID (8) MMT packet: indicates a formatted unit of media data transferred using an MMT protocol (9) MMT payload: indicates a formatted unit of media data carrying MMT packages and/or signaling messages by using an MMT protocol or an Internet application layer transport protocol (for example, Real-time Transport Protocol: RTP)

(10) MMT reception entity: indicates an MMT entity that receives and consumes media data

(11) MMT transport entity: indicates an MMT entity that transmits media data to one or more MMT reception entities

(12) Package: indicates logical collection of media data transferred using an MMT

(13) Repair REC payload ID: indicates an FEC payload ID for repair packets

(14) Repair symbol: indicates an encoding symbol including redundancy information for error correction

(15) Repair symbol block: indicates a sets of repair symbols that can be used for reconstructing lost source symbols

(16) Source FEC payload ID: indicates an FEC payload ID for source packets

(17) Source packet block: indicates a segmented set of an FEC source flow protected as a single block

(18) Source symbol: indicates a unit of encoded data by an FEC encoding process

(19) Source symbol block: indicates a set of source symbols generated from a single source packet block In an embodiment of the present invention, each of an ISOBMFF (ISO Base Media File Format)-based MPU (MMT (MPEG (Moving Picture Experts Group) Media Transport) Processing Unit) and an MMT hint track is defined, and an MPU mode is defined as one method of a packetized delivery of package. Further, a transmission device, for example, an MMT sending entity can perform a packet drop through the MMT hint track in an MPU mode.

In an embodiment of the present invention, an Application Layer (AP)-Forward Error Correction (FEC) framework for the MMT is defined. Further, with respect to source packets to pass through FEC protection, a repair packet is generated using an FEC code. FEC source packets generated by an addition of source FEC payload IDs (identifiers) to the source packets due to the FEC protection and the repair packet are transmitted together. An AL-FEC message including the FEC-related configuration information is transmitted before transmission of the FEC source packet and the repair packet or periodically transmitted, and an end having received the AL-FEC message may know the FEC-related configuration information. Since the source packet with a source FEC payload ID is transmitted, in order to generate another repair packet with respect to the same source packet, another source FEC payload ID should be added to the source packet. Therefore, the generation of several repair packets having different FEC configurations with respect to one source packet has a limitation or is inefficient.

Further, when a transmitter transmits only a source packet without performance of the FEC protection and an intermediate node of the network performs the FEC protection, the intermediate node of the network should add a source FEC payload ID to the source packet transmitted by the transmitter and change the source packet transmitted by the transmitter. Accordingly, a method of performing the FEC protection without adding the source FEC payload ID to the source packet is required. Embodiments of the present invention described below provide a method and an apparatus for performing FEC protection on a source packet in a packet drop.

A transmission method and apparatus according to an embodiment of the present invention generate assets and MMT packets for a signal message to be transmitted, generate MMT packets corresponding to assets to perform FEC protection among the assets according to an MPU mode, drop at least one MMT packet among the MMT packets, separately generate information indicating the drop with respect to each of the dropped MMT packets, generate repair data based on information indicating the existence or non-existence of a drop by performing FEC protection on the information indicating the non-drop and the information indicating the drop, generate a source symbol block including one or more source symbols from data blocks to perform the FEC protection in the MMT packets after the drop operation, generate one or more repair symbols by applying the FEC to the source symbol block, generate at least one FEC repair packet to transmit the repair symbol and the repair data, and transmit the MMT packets and the FEC repair packets.

A reception method and apparatus according to an embodiment of the present invention receive MMT packets and FEC repair packets from a transmission device, acquire repair data and repair symbols included in the FEC repair packets based on FEC repair payload IDs of the received FEC repair packets, acquire information required for FEC decoding including the number, orders, and a start point of pieces of information on the existence or non-existence of the drop of MMT packets protected by the repair data, generate information indicating that the received MMT packet is not dropped based on the acquired information required for the FEC decoding, loss-processing the information on the existence or non-existence of the drop of MMT packets, which have not been received, to reconstruct the lost information on the existence or non-existence of the drop by using the repair data, recognize an actually lost MMT packet and the MMT packet which the transmission device dropped among the MMT packets, which have not been received, in the reconstructed information on the existence or non-existence of the drop, configure a source symbol block from the remaining MMT packets except for the MMT packets, which the transmission device dropped, among the MMT packets, which have not been received, that is, the received MMT packets and the actually lost MMT packets, reconstruct a loss-processed source symbol within the source symbol block by using the acquired protected symbol, and reconstruct a source packet from the source symbol. Further, the reconstructed source packets are input into an MPU de-capsulator, and the MPU de-capsulator de-capsulates source packets by using MPU hint track information within an MPU header and inputs a result thereof into a codec decoder.

According to an embodiment of the present invention, data to perform FEC protection in MMT packets after the packet drop, that is, source packets refer to MMT packets themselves, MMT protocol payloads except for an MMT protocol header in the MMT packets after the packet drop, Data Units (DUs) except for an MMT packet header and an MMT packet payload header in the MMT packets after the packet drop, or DU payloads also except for a DU header. Here, information indicating non-drop refers to flag information simply indicating the existence or non-existence of the drop, length information of data to pass through FEC protection within the corresponding MMT packet, or information on a number of source symbols (or a number of source symbol elements) generated for the FEC protection from the data to pass through the FEC protection within the corresponding MMT packet. The FEC repair packet includes an MMT packet header and further includes an FEC repair payload ID. The FEC repair payload ID includes direct/indirect information required for an FEC decoding by the reception device such as a number of pieces of information on the existence or non-existence of the drop protected by the repair data of the FEC repair packet, that is, and a number, orders, and a start point of MMT packets before the drop.

Further, according to an embodiment of the present invention, the reception device may calculate information on the number of source symbols within the source symbol block or the number of source symbol elements from the number of pieces of information on the existence or non-existence of the drop and a value thereof. For example, the information on the existence or non-existence of the drop may be length information of data within the FEC-protected MMT packet and the reception device knows a length of the data within the FEC-protected MMT packet in the MMT packets, which have not been dropped, so that the reception device may reconfigure a source symbol block according to a source symbol block generation method applied by the transmission device based on the reconstructed information on the existence or non-existence of the drop. Of course, a source symbol for the lost MMT packet is loss-processed.

A method and an apparatus according to another embodiment of the present invention generate a repair symbol by performing an FEC encoding on MMT packets after the drop. Then, an FEC repair packet is generated from the generated repair symbol, and the FEC repair packet is transmitted along with the MMT packets after the drop. A source FEC payload ID is added to each of the FEC-protected MMT packets after the drop and the MMT packets are transmitted.

A method and an apparatus according to another embodiment of the present invention reconfigure a source symbol and a repair symbol from the MMT packets to which the received source FEC payload ID is added and the FEC repair packets. At this time, a source symbol corresponding to the lost MMT packet is loss-processed. Then, the loss-processed source symbol is reconstructed through the FEC decoding, and data to pass through the FEC protection within the lost MMT packet is acquired from the reconstructed source symbol and input into the MPU de-capsulator. The MPU de-capsulator de-capsulates the MPU by using MPU hint track information within an MPU header and inputs a result thereof into a codec decoder.

A method and an apparatus according to another embodiment of the present invention generate a repair symbol by adding a value appointed with the reception device by a length of the repair symbol, for example, 00h to the dropped MMT packet and performing the FEC encoding along with MMT packets after the drop. An FEC repair packet is generated from the generated repair symbol, and the FEC repair packet is transmitted along with the MMT packets after the drop.

A reception method and apparatus according to another embodiment of the present invention recognize a dropped situation when a value of the data reconstructed by the FEC decoding is a value appointed with the transmission device, and consider the corresponding data as invalid data or discard the data. The reconstructed data, which has not been dropped, is input into the MPU de-capsulator, and the MPU de-capsulator de-capsulates the MPU by using MPU hint track information within an MPU header and inputs a result thereof into a codec decoder.

FIG. 1 illustrates an example of an MPU format according to an embodiment of the present invention.

Referring to FIG. 1, FIG. 1(a) illustrates an MPU of timed media having time information for decoding and presentation, and FIG. 1(b) illustrates an MPU of non-timed media having no time information for decoding and presentation. The MPU of timed media includes data containing inherent time information for decoding and/or presentation of media contents, and the MPU of non-timed media includes data that does not contain inherent time information for decoding and/or presentation of media contents.

The MPU of timed media illustrated in FIG. 1(a) includes ftyp 102, mmpu 104, moov 106, moof 112, and mdat 114. The ftyp 102 includes file information, the mmpu 104 includes information for MPU division, and the moov 106 includes a media track 108 and an MMT hint track 110. Here, the MMT hint track 110 includes a header for real-time packet transmission. The moof 112 is repeatedly and frequently transmitted.

The MPU of non-timed media illustrated in FIG. 1(b) includes ftyp 122, mmpu 124, moov 126, meta 130, and items 132 and 134. The ftyp 122 includes file information, the mmpu 124 includes information for MPU division, and the moov 126 includes an MMT hint track 128.

When it is determined that the drop for the packet is required according to a network situation, the MMT sending entity (or sender) performs segmentation on the MPU based on information of the MMT hint tracks 110 and 128 of the MPU to packetize the MPU into a plurality of packets, and drops and transmits packets having relatively low importance such as B-frame among the plurality of packets.

Figure 2:
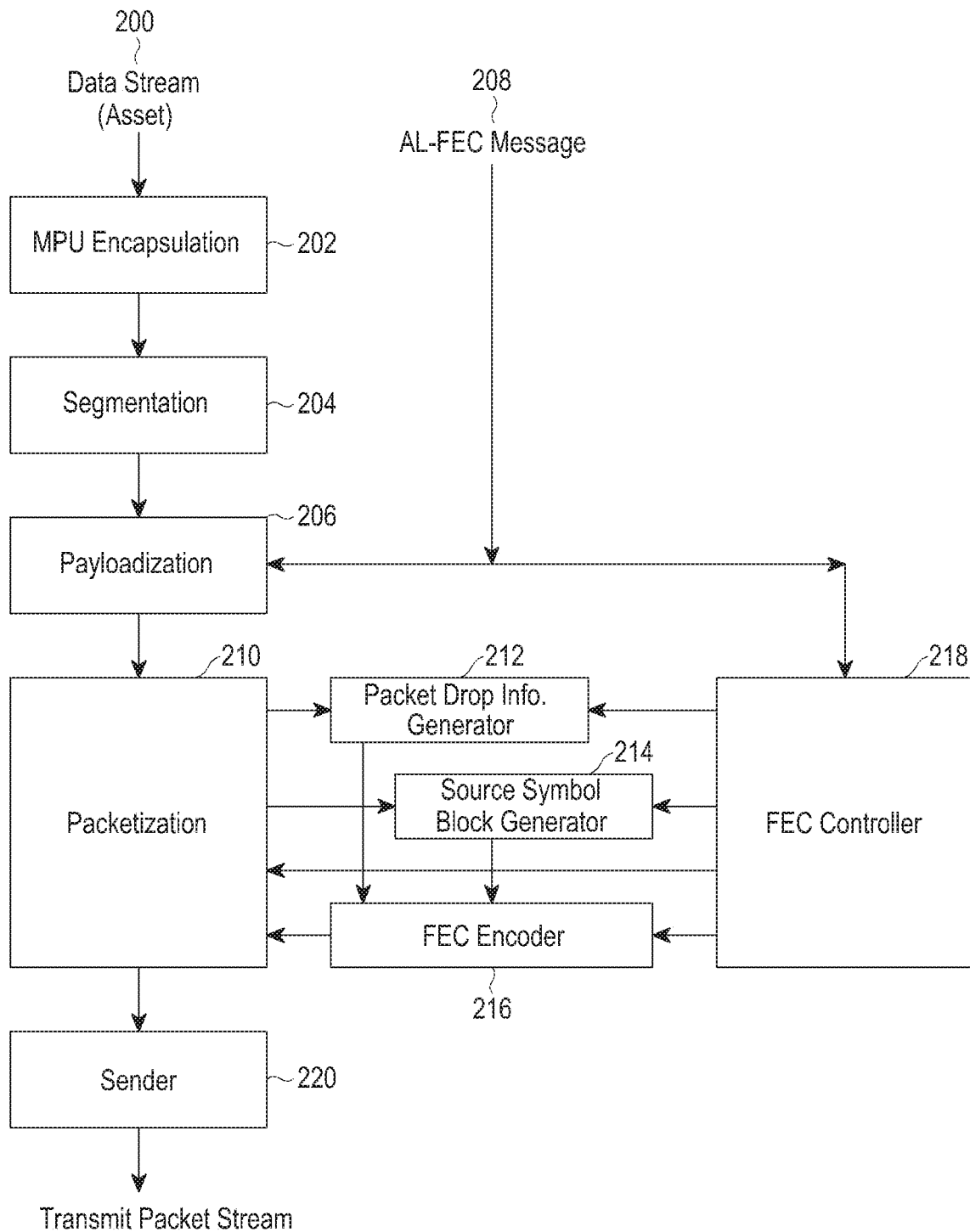
FIG. 2 illustrates an example of a block configuration of a transmission device according to an embodiment of the present invention.

FIG. 2 illustrates an example of a block configuration of a transmission device according to an embodiment of the present invention.

Referring to FIG. 2, the transmission device includes a sender (or sending entity) 220, a packet drop information generator 212, a source symbol block generator 214, an FEC encoder 216, and an FEC controller 218.

The transmission device generates the MPU by performing MPU encapsulation 202 on a data stream generated from a codec encoder or a stored data stream (asset). The asset refers to a multimedia data entity related to a unique ID.

Then, the transmission device performs the segmentation 204 on the MPU based on hint track information of the MPU and performs payloadization 206 by adding an MMT protocol payload header to the MPU. The MMT protocol payload header includes information on a segmented situation of the MPU. Based on an assumption that the AL-FEC is applied, when it is required to transmit an AL-FEC message 208 by a separate packet, the AL-FEC message also passes through the payloadization process. Here, when packetization 210 is performed through the addition of the MMT protocol header, a packet-ID for identifying the asset and a packet sequence number scoped by the packet_ID are set to each MMT protocol header. The packet_ID identifies the asset, and a range of the packet sequence number is determined by the packet_ID.

After the packetization, when the sender 220 desires to drop the MMT packet (or source packet), the sender 220 drops a relevant packet among the packets to be transmitted and then transmits the remaining packets. When the AL-FEC is applied, the packet drop information generator 212 generates packet drop information of the dropped packet, for example, packet length information, and the FEC encoder 216 performs an FEC encoding based on the packet drop information to generate a repair packet. Here, the length information of the dropped packet is set as 0 and, hereinafter, the repair and parity are used as the same meaning.

Further, the FEC encoder 216 generates a repair symbol block with respect to the transmitted MMT packets by the FEC encoding and generates an FEC repair packet including the repair data and the repair symbol. Here, the FEC repair packet refers to an MMT packet for the repair data and the repair symbol.

Meanwhile, the source symbol block generator 214 generates a source symbol block, and the FEC controller 218 controls an operation of each of the packet drop information generator 212, the source symbol block generator 214, and the FEC encoder 216.

Figure 3:
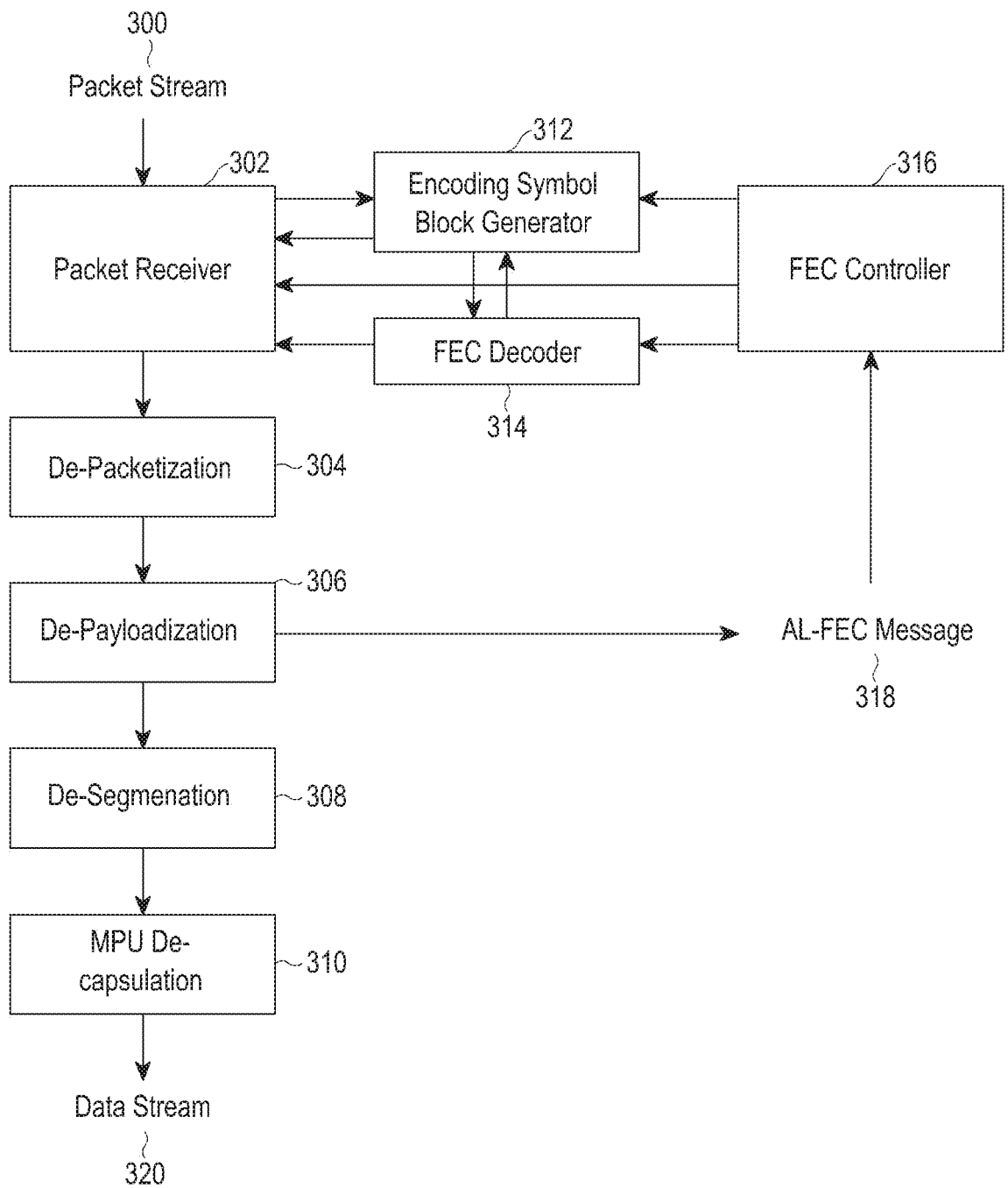
FIG. 3 illustrates an example of a block configuration of a reception device according to an embodiment of the present invention.

FIG. 3 illustrates an example of a block configuration of a reception device according to an embodiment of the present invention.

Referring to FIG. 3, the reception device includes a packet receiver 302, an encoding symbol block generator 312, an FEC decoder 314, and an FEC controller 316.

In general, a data stream 320 is reconstructed through processes of de-packetization 304 (for example, MMT de-packetization or parsing), de-payloadization 306 (for example, MMT de-payloadization or parsing), de-segmentation 308, and MPU de-capsulation 310. When the AL-FEC message 318 is transmitted by a separate packet, if the payload stores signaling data indicating the AL-FEC message in the process of de-payloadization 306, the reception device grasps basic information on an FEC configuration required for the FEC decoding through parsing. Then, detailed information separated for each FEC packet block is acquired from a repair FEC payload ID of the FEC repair packet of the corresponding FEC packet block.

When information on the FEC configuration required for the FEC decoding is transmitted within the FEC repair packet, FEC decoding-related information is acquired from the repair FEC payload ID of the FEC repair packet in the process of de-packetization 304 of the FEC repair packet. The encoding symbol block generator 312 of the reception device having received all the FEC decoding-related information generates packet drop information from the received MMT packets. At this time, packet drop information on MMT packets, which have not been received, is considered as being lost. The encoding symbol, that is, packet drop information and repair data for the packet drop information are configured using the repair data within the received FEC repair packet, and the packet drop information and the repair data are input into the FEC decoder 314. The FEC decoder 314 reconstructs drop information of the lost MMT packet.

The encoding symbol block generator 312 distinguishes between the actually lost packet and the packet which the transmission device drops among the MMT packets, which have not been received, in the reconstructed drop information and generates a source symbol block from the received MMT packets based on the information. Then, an encoding symbol, that is, a source symbol and a repair symbol for the source symbol are configured using the repair symbols of the FEC repair packet, and the source symbol and the repair symbol are input into the FEC decoder 314. The FEC decoder 314 reconstructs the lost MMT packet by using the repair symbols of the received FEC repair packet. The reconstructed MMT packet is switched to a data stream 320 through processes of de-packetization 304, de-payloadization 306, de-segmentation 308, and MPU de-capsulation 310.

Figure 4:
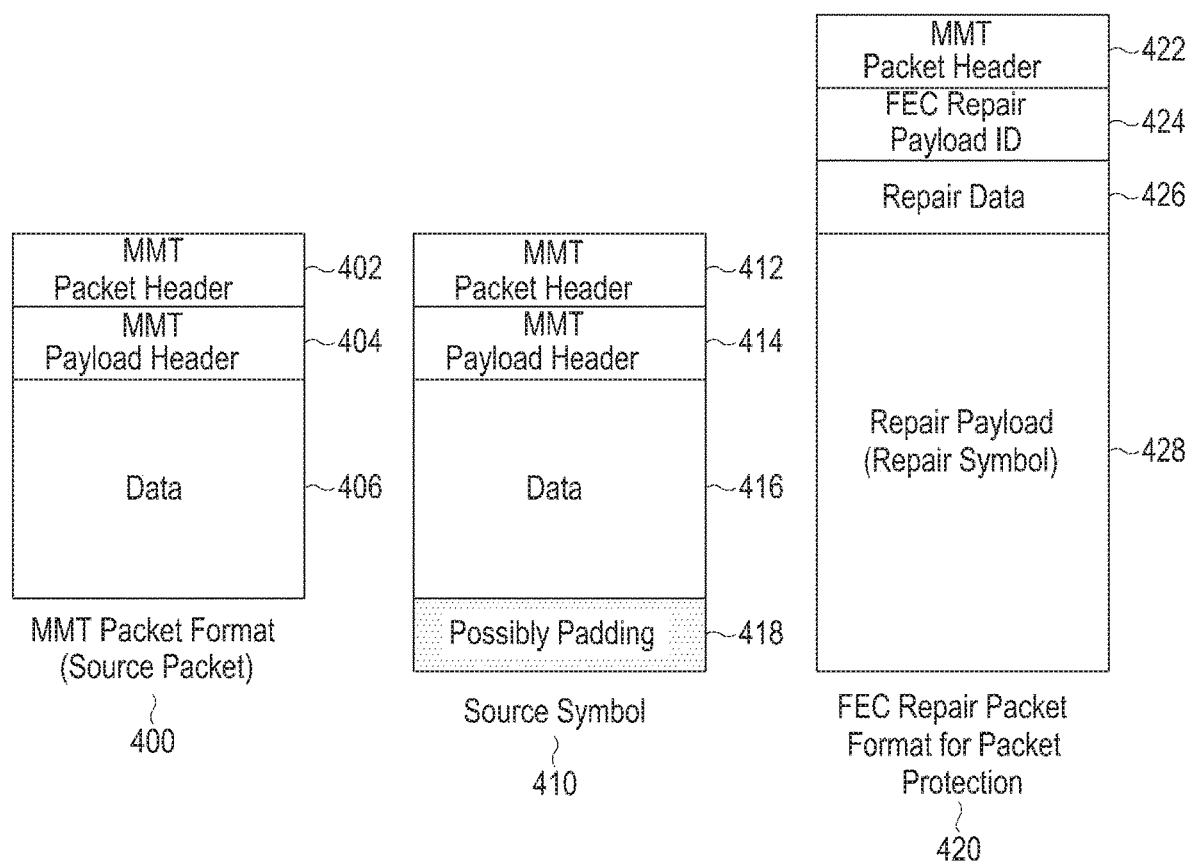
FIG. 4 illustrates an example of a source packet, a source symbol, and an FEC repair packet according to an embodiment of the present invention.

FIG. 4 illustrates a format of a source packet, a source symbol and an FEC repair packet according to an embodiment of the present invention.

Referring to FIG. 4, the MMT packet, that is, a source packet 400 includes an MMT packet header 402, an MMT payload header, and data (or payload).

A source symbol 410 is generated by adding a possibly padding 418 to the source packet 400 and, for example, the AL-FEC message is given or padding data (00h) of a difference from a size of a predetermined repair symbol is added. Accordingly, the source symbol 410 includes an MMT packet header 412, an MMT payload header 414, data 416, and the possibly padding 418.

An FEC repair packet 420 includes an MMT packet header 422, an FEC repair payload ID 424, repair data 426, and a repair payload (or repair symbol) 428. The repair data 426 is generated based on packet drop information by the FEC encoder, and the repair symbol 428 is generated from the source symbol block.

Figure 5:
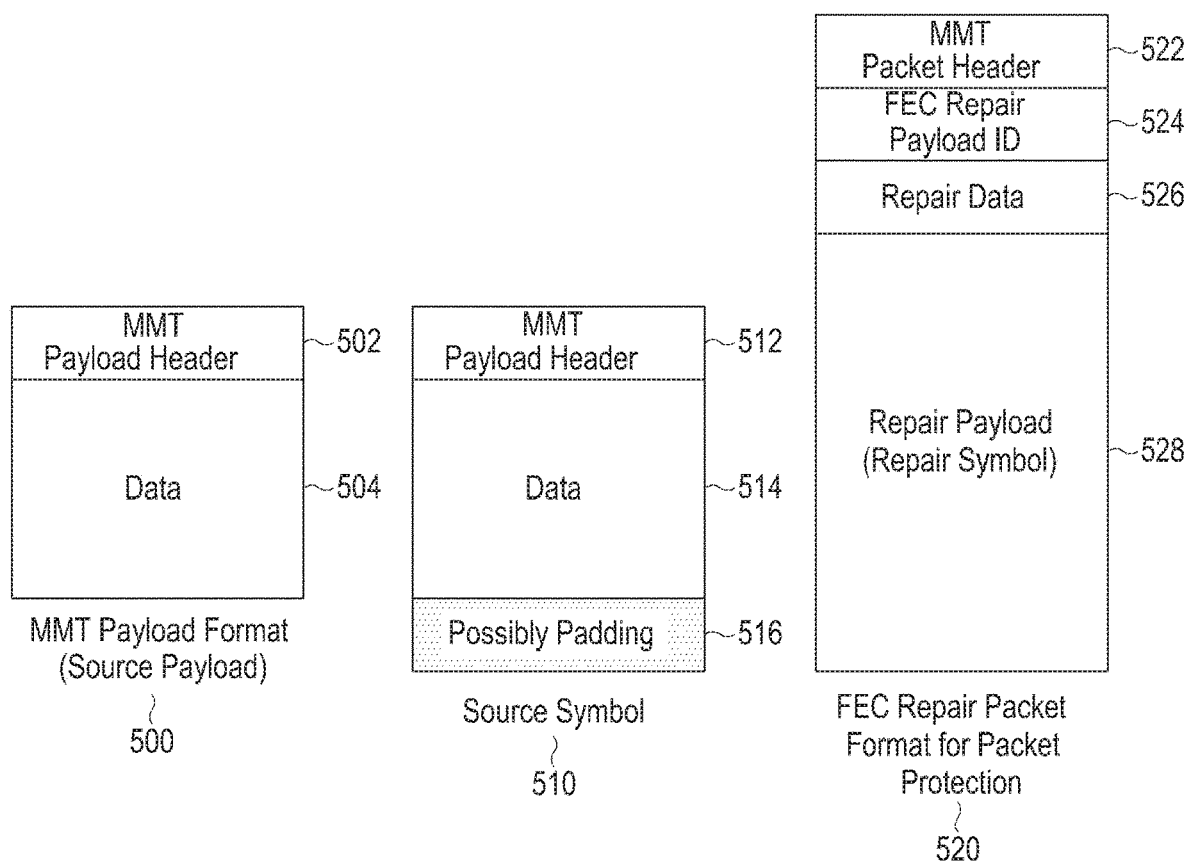
FIG. 5 illustrates another example of a source payload, a source symbol, and an FEC repair packet according to an embodiment of the present invention.

FIG. 5 illustrates a format of a source payload, a source symbol and an FEC repair packet according to an embodiment of the present invention.

Referring to FIG. 5, the MMT payload, that is, a source payload 500 includes an MMT payload header 502 and data (or payload) 504.

A source symbol 510 is generated by adding a possibly padding 516 to the source payload 500 and, for example, the AL-FEC message is given or padding data (00h) of a difference from a size of a predetermined repair symbol is added. Accordingly, the source symbol 510 includes an MMT packet header 512, data (or payload) 514, and the possibly padding 516.

An FEC repair packet 520 includes an MMT packet header 522, an FEC repair payload ID 524, repair data 526, and a repair payload (or repair symbol) 528. The repair data 526 is generated based on packet drop information by the FEC encoder, and the repair symbol 528 is generated from the source symbol block.

Figure 6:
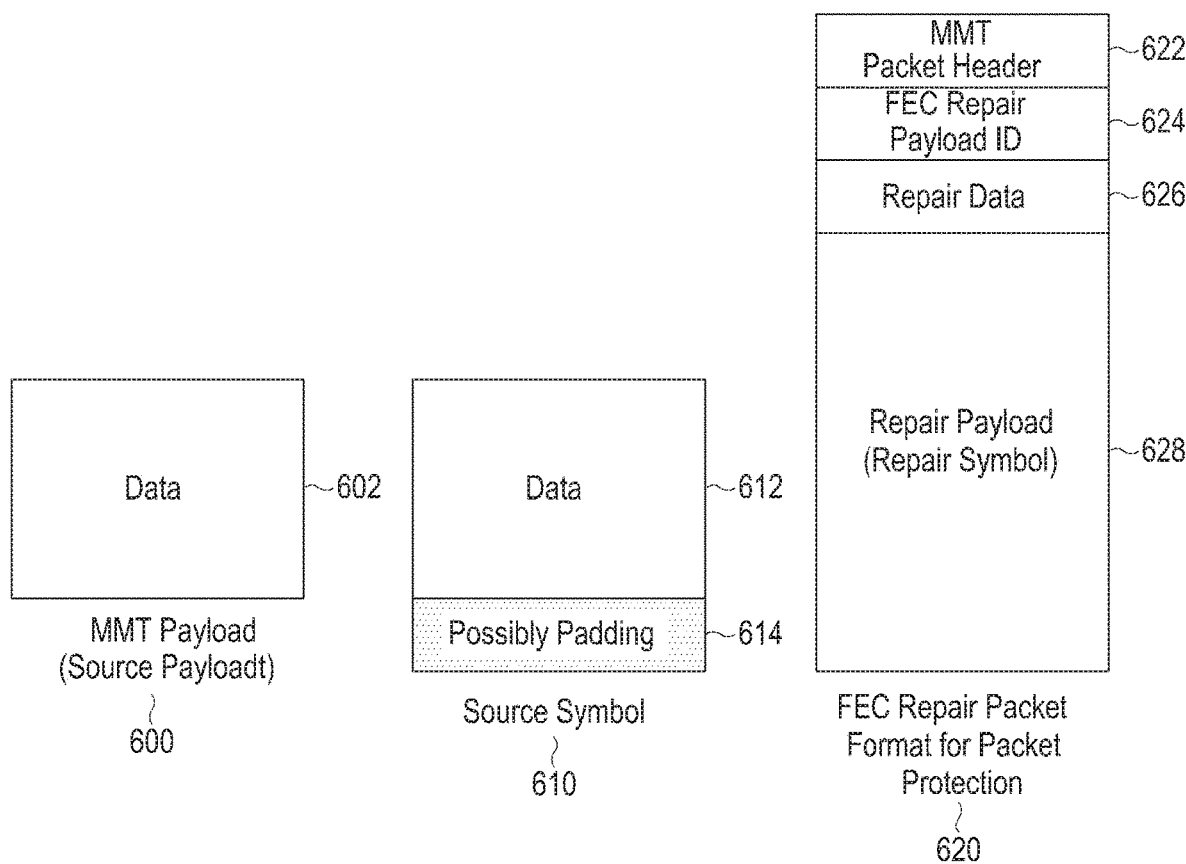
FIG. 6 illustrates another example of a source payload, a source symbol, and an FEC repair packet according to an embodiment of the present invention.

FIG. 6 illustrates another format of a source payload, a source symbol and an FEC repair packet according to an embodiment of the present invention.

Referring to FIG. 6, the MMT payload, that is, a source payload 600 includes data (or payload).

A source symbol 610 is generated by adding a possibly padding 614 to the MMT payload 600 and, for example, the AL-FEC message is given or padding data (00h) of a difference from a size of a predetermined repair symbol is added. Accordingly, the source symbol 610 includes data 612 and the possibly padding 614.

An FEC repair packet 620 includes an MMT packet header 622, an FEC repair payload ID 624, repair data 626, and a repair payload (or repair symbol) 628. The repair data 626 is generated based on packet drop information by the FEC encoder, and the repair symbol 628 is generated from the source symbol block.

The FEC repair payload ID may be the same as that in the filed patents 10-2014-0004256 and 10-2014-0004259, and only a part different from the FEC repair payload ID of the filed patents will be described herein. That is, SSB_length information indicates a number of MMT packets before the packet drop instead of information on a number of source symbols of a source symbol block, and RD length information indicating a number of pieces of repair data is newly added to the FEC repair payload ID.

Further, the repair FEC payload ID includes a flag indicating whether the corresponding FEC repair packet includes repair data for protecting packet drop information. This is because the application of the packet drop is different according to the FEC packet block and the generation and transmission of the repair data for packet drop information are not needed when the packet drop is not generated.

Figure 7:
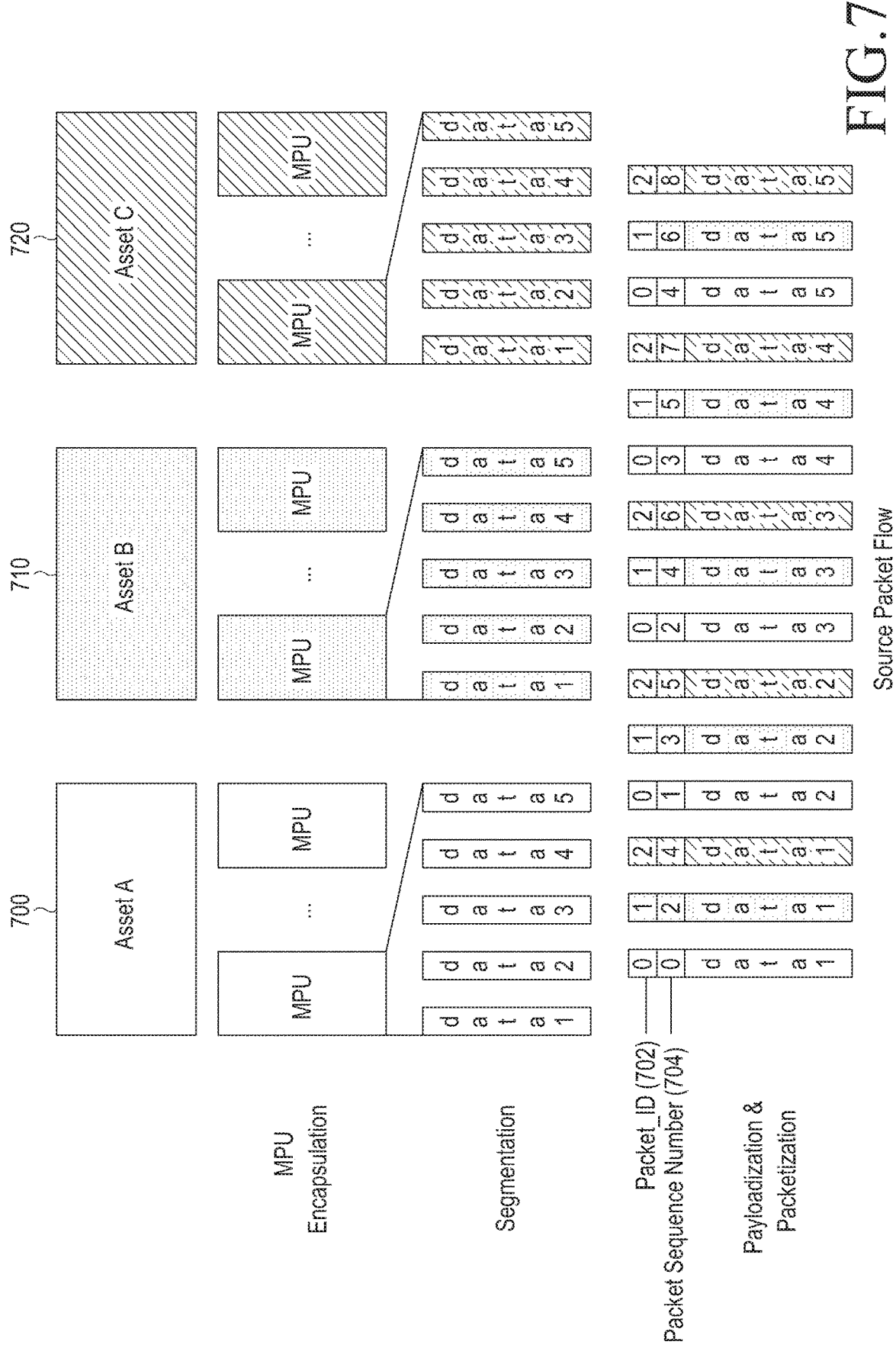
FIG. 7 illustrates an example for generating a source packet flow according to an embodiment of the present invention.

FIG. 7 illustrates an example of generation of a source packet flow according to an embodiment of the present invention.

Referring to FIG. 7, when there are three assets A, B, and C 700, 710, and 720, for example, non-timed data or timed-data such as audio data, video data, text data, a file, each asset is capsulated into a predetermined number of MPUs and each MPU is divided into a predetermined size of data. Then, an MMT packet flow (or source packet flow) is configured adding an MMT payload header and an MMP packet header to each data.

That is, one of the MPUs capsulated from each asset A, B, or C 700, 710, or 720 is divided into five data payloads, and a header including a packet_ID 702 and a packet sequence number 704 is added to each data payload. Packet_ID=0 for identifying packets of asset A 700, packet_ID=1 of asset B, and packet_ID=2 of asset C are allocated, and the packet sequence number based on each packet_ID increases one by one. The header may be, for example, an MMT packet header.

Figure 8:
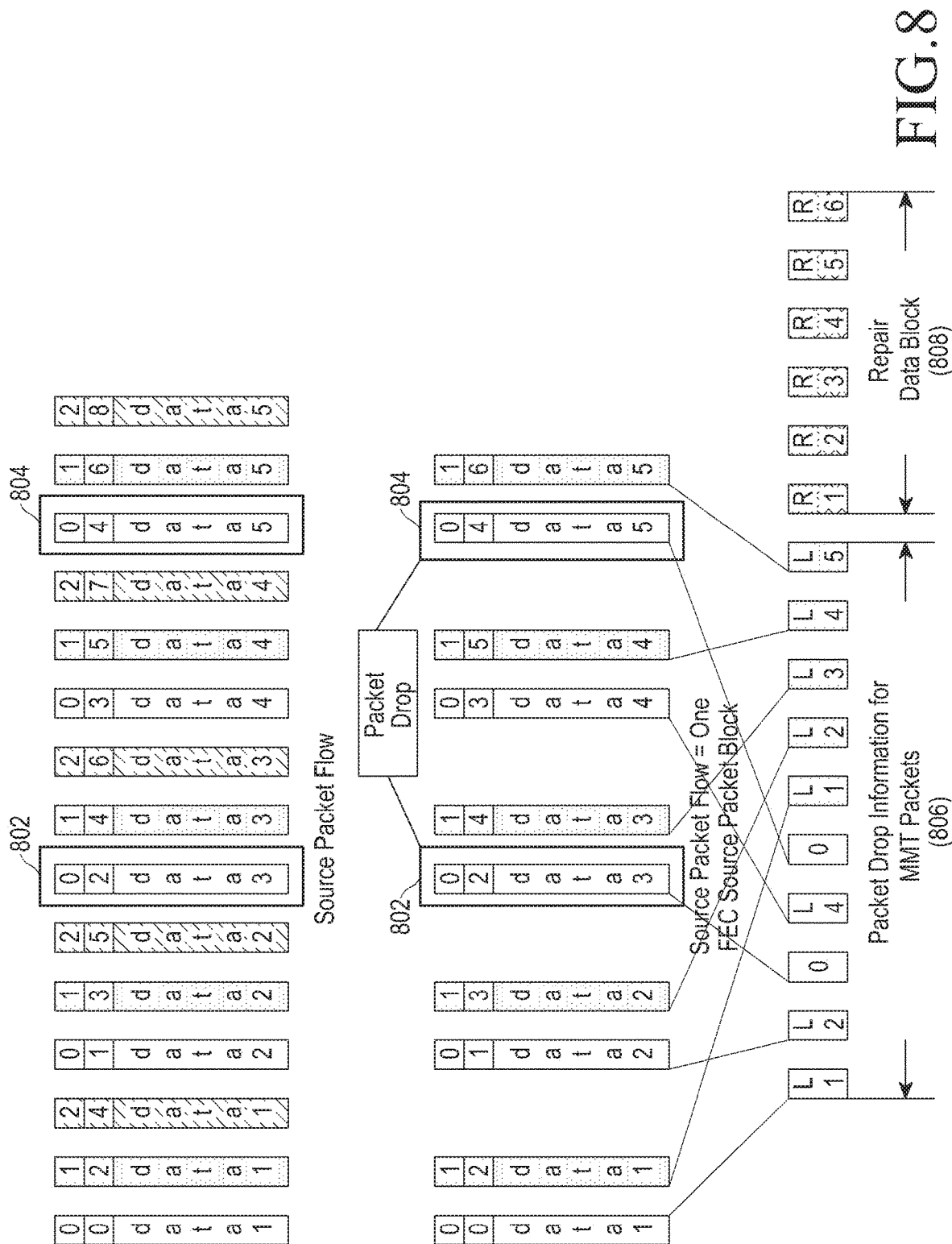
FIG. 8 illustrates an example for generating a source packet block (or source symbol block) according to an embodiment of the present invention.

FIG. 8 illustrates an example of generating a source packet block (or source symbol block) according to an embodiment of the present invention.

Referring to FIG. 8, it is assumed that an FEC source packet flow (=1 source packet block) is configured by selecting packets corresponding to two packet_IDs having packet_ID=0 or 1 from the source packet flow of the packets including three packet IDs and third and fifth packets of the packets having packet_ID=0 are dropped.

After packet drop information 806 for MMT packets is generated by first arranging packet drop information on packets having packet_ID=0 among the packets after the drop and then arranging packet drop information on packets having packet_ID=1, a repair data block 808 is generated by the FEC encoding. Here, the packet drop information may be, for example, length information of the FEC-protected packet and, at this time, the length information of the FEC-protected packet for the dropped packet is set as 0.

Figure 9:
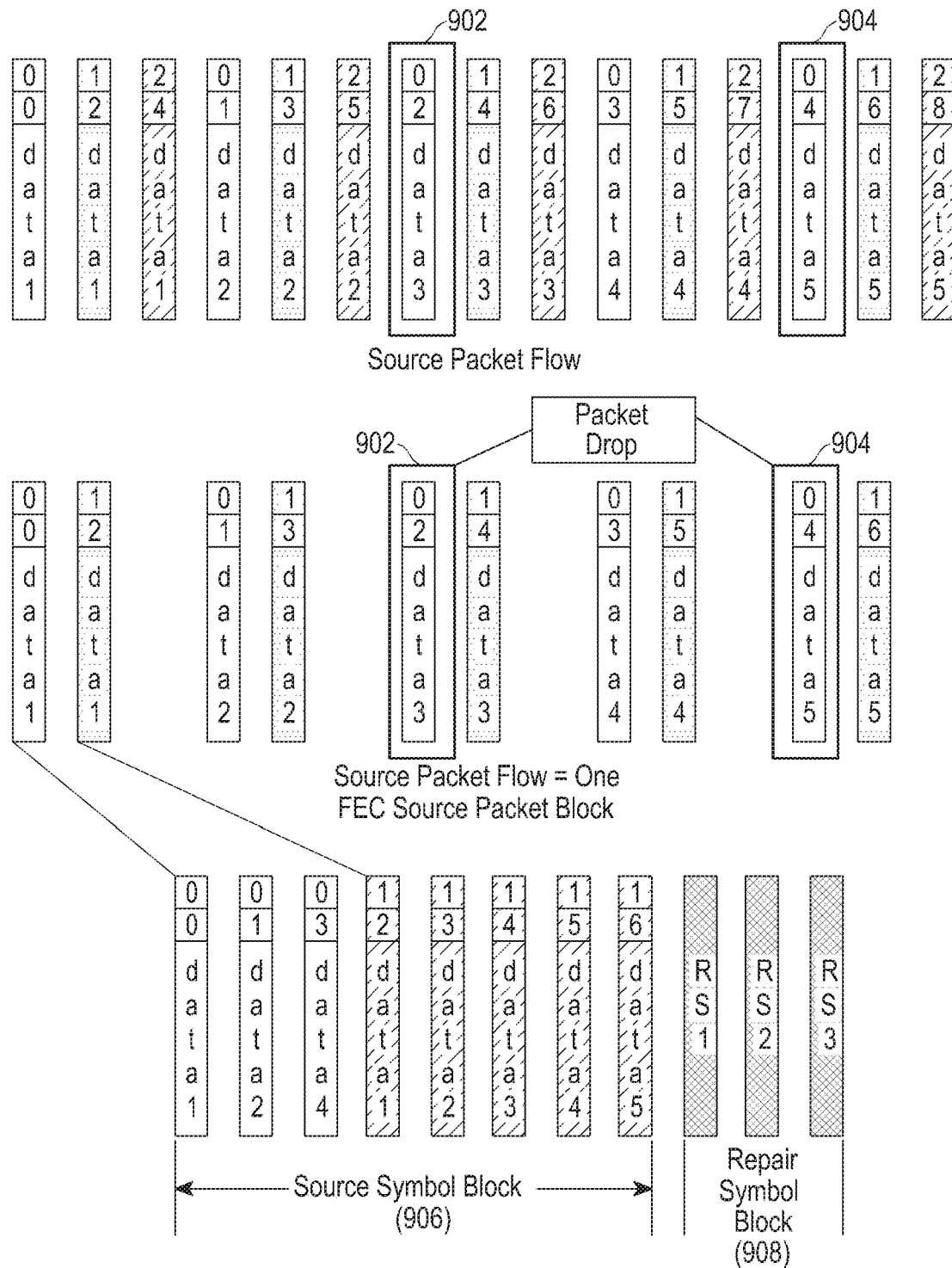
FIG. 9 illustrates another example for generating a source packet block (or source symbol block) according to an embodiment of the present invention.

FIG. 9 illustrates another example for generating a source packet block (or source symbol block) according to an embodiment of the present invention.

Referring to FIG. 9, it is assumed that an FEC source packet flow (=1 source packet block) is configured by selecting packets corresponding to two packet_IDs having packet_ID=0 or 1 from the source packet flow of the packets including three packet_IDs and third and fifth packets of the packets having packet_ID=0 are dropped.

After a source symbol block 906 is generated by first arranging packets having packet_ID=0 among the packets after the drop and then arranging packets having packet_ID=1, a repair symbol block 908 is generated by the FEC encoding. If lengths of the source packets are different when the source packet switches to the source symbol, padding is needed (SSBG_MODE1). When the lengths of the source packets are the same as each other, padding is not needed (SSBG_MODE0).

Figure 10:
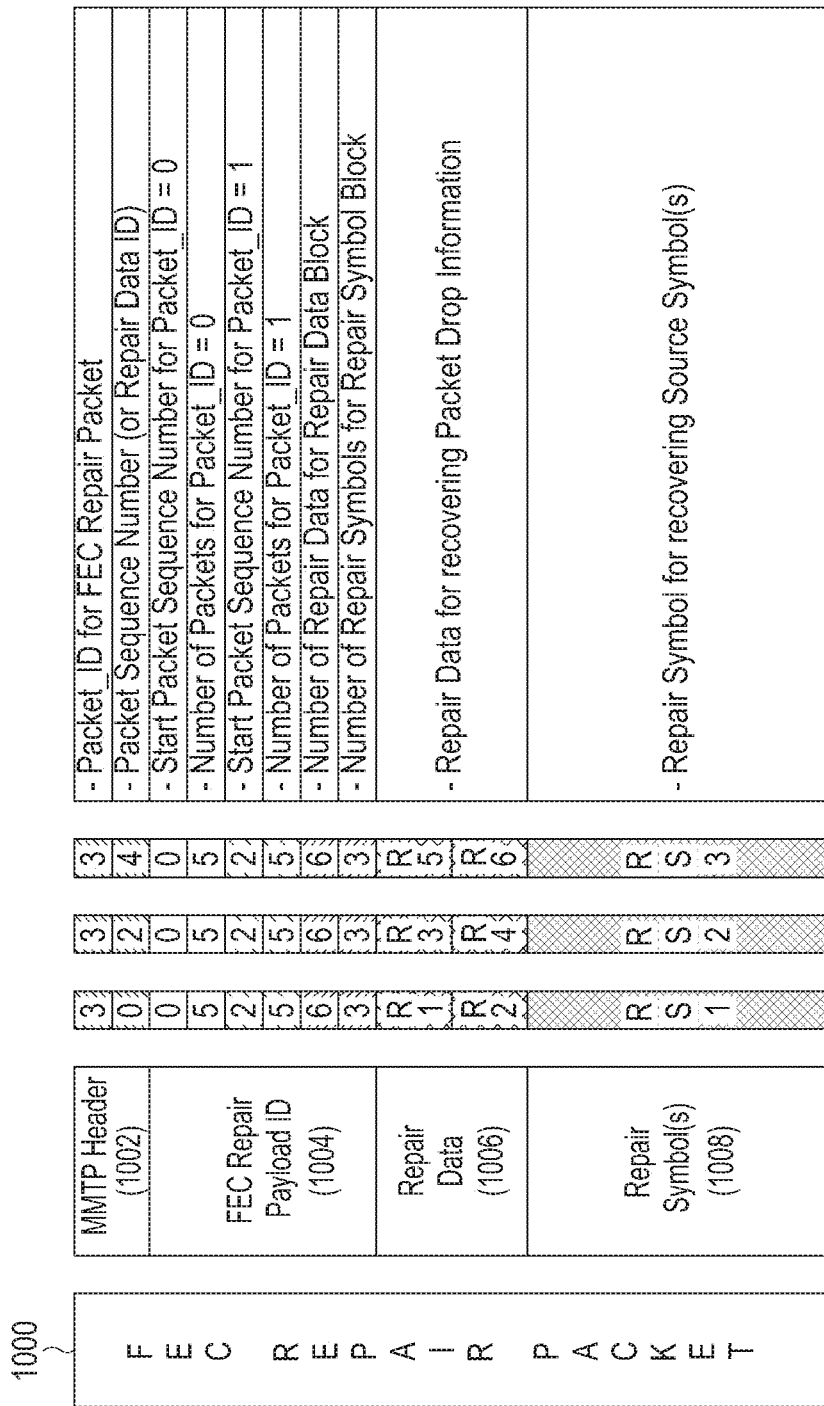
FIG. 10 illustrates an example of three FEC repair packets for transmitting generated six pieces of repair data and three repair symbols according to an embodiment of the present invention.

FIG. 10 illustrates an example of three FEC repair packets for transmitting six repair data blocks and three repair symbols generated from the embodiment of FIGS. 8 and 9.

Referring to FIG. 10, each FEC repair packet 1000 includes an MMTP header 1002, an FEC repair payload ID 1004, repair data 1006, and a repair symbol 1008.

The MMTP header 1002 includes a packet_ID and a packet sequence number (or repair data ID) for the FEC repair packet and, here, the packet_ID for the FEC repair packet is set as 3 to be distinguished from the source packet. A packet sequence number field value is set to indicate an index within the repair data block of the repair data 1006. The FEC repair payload ID 1004 is set to indicate the number of packets and a start packet sequence number for each of two packet_IDs within the source symbol block. Here, the number packets for each of the two packet_IDs refers to the number of MMT packets before the packet drop having the packet_ID.

The repair data 1006 includes pieces of repair data for reconstructing the packet drop information, and the repair symbol 1008 includes repair symbols for reconstructing the source symbols. Here, the repair data are arranged two by two, and one repair symbol is placed to follow. Accordingly, the reception device may reconstruct the packet drop information based on the FEC repair payload ID 1004 and the repair data 1006 and properly configure the source symbol block from the received MMT packets by recognizing locations and the number of dropped packets. Further, the reception device reconstructs the lost packet by using the repair symbol 1008 after configuring the source symbol block.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

Further, a method and an apparatus for transmitting and receiving a packet according to an embodiment of the present invention can be implemented in the form of hardware, software, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. A web widget manufacturing method of the present invention can be realized by a computer or a portable terminal including a controller and a memory, and it can be seen that the memory corresponds to an example of the storage medium which is suitable for storing a program or programs including instructions by which the embodiments of the present invention are realized, and is machine readable.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, an apparatus for transmitting and receiving a packet according to an embodiment of the present invention may receive the program from a program providing apparatus connected wiredly or wirelessly and store the program. The program supply apparatus may include a program that includes instructions to execute the exemplary embodiments of the present invention, a memory that stores information or the like required for the exemplary embodiments of the present invention, a communication unit that conducts wired or wireless communication with the electronic apparatus, and a control unit that transmits a corresponding program to a transmission/reception apparatus in response to the request from the electronic apparatus or automatically.

The invention claimed is:

1. A method of transmitting a packet in a transmission device of a communication system, the method comprising:
   obtaining source packets based on at least one asset, each of the at least one asset being a multimedia data entity associated with a unique identifier;
   dropping at least one source packet among the source packet, wherein each of the source packets comprising the dropped at least one source packet includes data related to the at least one asset;
   generating one or more repair symbols by forward error correction (FEC) encoding remaining source packets except the dropped at least one source packet among the source packets;
   generating repair data for protecting drop information indicating the dropped at least one source packet including data related to the at least one asset; and
   transmitting the remaining source packets and repair packets including the one or more repair symbols and the repair data for protecting the drop information to a reception device.

2. The method of claim 1, wherein wherein an indicator coresponding to the drop at least one source packet included in the drop information is set as 0.

3. The method of claim 1,
   wherein the repair packet further includes a repair payload identifier (ID), and
   wherein the repair payload ID includes a number of source packets except the dropped at least one source packet according to each packet ID and information on a start number of the source packets ecept the dropped at least one source packet related to the packet ID.

4. A method of receiving a packet in a reception device of communication system, the method comprising:
   receiving source packets and repair packets including one or more repair symbols and repair data for protecting drop information indicating at least one source packet dropped by a transmission device, from the transmission device;
   recovering the drop information from the repair data; and
   recovering the at least one source packet dropped by the transmission device based on the drop information and the one or more repair symbols,
   wherein each of the received source packets and the at least one packet dropped by the transmission device includes data related to at least one asset,
   wherein each of the at least one asset is a multimedia data entity associated with a unique identifier.

5. The method of claim 4, wherein an indicator corresponding to the at least one source packet included in the drop information is 0.

6. The method of claim 4, wherein the repair data and the repair symbols are obtained based on a repair payload ID including a number of source packets according to each packet identifier (ID) and information on a start number of source packets related to the packet ID.

7. A transmission device for transmitting packets in a communication system, the transmission device comprising:

a transmitter configured to drop at least one source packet among source packets, wherein each of the source packets comprising the dropped at least one source packet includes data related to at least one asset, each of the at least one asset being a multimedia data entity associated with a unique identifier; and at least one processor coupled to the transmitter, wherein the at least one processor configured to:

generate one or more repair symbols by forward error correction (FEC) encoding remaining source packets except the dropped at least one source packet among the source packets, generate repair data for protecting drop information indicating the dropped at least one packet including data related to the at least one asset; and control the transmitter to transmit the remaining source packets and repair packets including the one or more repair symbols and the repair data for protecting the drop information to a reception device.

8. The transmission device of claim 7, wherein an indicator corresponding to the dropped at least one source packet included in the drop information is set as 0.

9. The apparatus of claim 7, wherein the repair packet further includes a repair payload identifier (ID), and wherein the repair payload ID includes a number of source packets except the dropped at least one source packet according to each packet ID and information on a start number of source packets except the dropped at least one source packet related to the packet ID.

10. A reception device for receiving a packet in a communication system, the reception device comprising:

a receiver that receives source packets and a repair packet including one or more repair symbols and repair data for protecting drop information indicating at least one source packet dropped by a transmission device, from the transmission device; and at least one processor coupled to the receiver, wherein the at least one processor configured to:

recover the drop information from the repair data, and recover the at least one source packet dropped by the transmission device based on the drop information and the one or more repair symbols, wherein each of the received source packets and the at least one packet dropped by the transmission device includes data related to at least one asset, and wherein each of the at least one asset is a multimedia data entity associated with a unique identifier.

11. The reception device of claim 10, wherein an indicator corresponding to the at least one source packet included in the drop information is 0.

12. The reception device of claim 10, wherein the one or more repair symbols are obtained based on a repair payload ID including a number of the source packets according to each packet identifier (ID) and information on a start number of the source packets related to the packet ID.

* * * * *